June 21, 1966 S. KAYE 3,257,161
POTENTIATION OF BIOCIDAL ACTIVITY OF EPOXIDES
Filed Jan. 21, 1963

INVENTOR.
SAUL KAYE
BY
Kegan, Bellamy & Kegan
ATT'YS.

3,257,161
POTENTIATION OF BIOCIDAL ACTIVITY
OF EPOXIDES
Saul Kaye, Evanston, Ill., assignor, by mesne assignments, to Saul Kaye, Evanston, Ill., as trustee
Filed Jan. 21, 1963, Ser. No. 252,642
17 Claims. (Cl. 21—58)

This invention relates to sterilization techniques and more particularly to improved sterilization techniques of the epoxide treatment type and of the formic acid treatment type.

The class of chemical compounds called epoxides is known to possess biocidal activity, or the ability to terminate the vital processes of living organisms. The term "epoxide" or "oxirane" has been applied to the chemical grouping or to compounds containing this grouping. The two simplest epoxides are ethylene oxide and propylene oxide, and these two compounds, because of their great chemical reactivity and their physical properties, have found extensive use both as insecticidal fumigants and as sterilizing agents in medicine and in industry. The chemical reactivity of the epoxides accounts for their unspecific attack on biologically important molecules, which renders these compounds effective sterilizing agents even for bacterial spores which resist the activity of many otherwise useful disinfectants. The high vapor pressures of these compounds at ordinary temperatures enables them to be applied as vapors, and thus to penetrate well into crevices and other inaccessible locations, and as well to pass through a variety of packaging materials. Because of this volatility, these compounds can be used to treat packaged instruments and goods, and after sterilization has been effected, the residual epoxide may be removed from the package by desorption. Evacuation and air-washing as well as elevated temperatures are used to speed up the removal of epoxides from the objects being treated.

This invention is concerned with eliminating certain disadvantages which have hindered the use of epoxides for sterilization. First, epoxides are rather slow-acting in their sterilizing activity, and second, moisture is required to some degree for the action of the epoxides, such that as a result extremely dry materials cannot now be sterilized by epoxide treatment.

The subject invention concerns a method of potentiating the action of epoxides. By potentiating is meant "making more powerful" in a two-fold sense: first, that of increasing the rate of action of epoxides against microorganisms, and second, that of making epoxides effective under circumstances where they do not now exert a sterilizing activity, as against very dry materials.

While the nature of the mechanism of biocidal action of epoxides is not completely understood, these compounds have been found in many important applications to be the only available means of sterilizing. Drugs, medical and surgical equipment, foods, industrial goods, and the like have been and are routinely sterilized by exposure to epoxide vapors. Materials which would be damaged by the older methods involving steam, dry heat, or corrosive chemicals may be sterilized without damage and with comparative success with ethylene or propylene oxides. A number of large and small sterilizers are available commercially for hospitals, doctors, and for industry, incorporating the use of these sterilizing agents.

There are, however, three important drawbacks to the conventional utilization of epoxide sterilization: (1) dry materials are resistant and often remain non-sterile for days in exposure chambers which will sterilize other materials in a few hours; (2) the process, when the epoxides are used at concentrations which will not dissolve plastics or other polymeric materials and which are safe and convenient to handle, is relatively slow, often requiring six or more hours to rid materials of ordinary contamination; and (3) relatively large amounts of epoxides are required, which in many industrial applications creates a problem of cost despite the low price and commercial availability of the compounds.

Likewise, formic acid is known to exhibit certain biocidal effects; however, formic acid utilizations are of limited utility. The primary deficiency of formic acid treatments is that formic acid is relatively impotent as a sterilizing agent, especially when used at concentration levels which would prevent irritant and toxicity characteristics for the treatment. Moreover, when used at sufficient concentration levels to have any appreciable effect, formic acid treatments tend to exhibit undesirable residual odor characteristics.

It is therefore an object of this invention to increase the effectiveness of epoxide materials as sterilizing agents in all instances where epoxides are now utilized for sterilization, as well as in instances where epoxides are not now capable of being utilized for sterilization.

It is a corresponding object of this invention to render formic acid materials suitable for use as sterilizing agents in an effective manner with any deleterious consequences, such as residual odor characteristics.

Thus, it is an object of this invention to utilize formic acid in conjunction with epoxide materials, whereby the combined efficacy of the sterilizing technique is superior to the mere additive properties of either component utilized separately.

More specifically, it is an object of this invention to reduce the time required for any given concentration of epoxide vapor or solution to sterilize a given contaminated object.

It is another object of this invention to reduce the concentration of epoxide required to sterilize a contaminated object in any given time.

It is yet another object of this invention to render highly desiccated microorganisms which are normally resistant to epoxide treatment susceptible to the action of epoxides, without introduction of water into the sterilization treatment.

Figure 1:
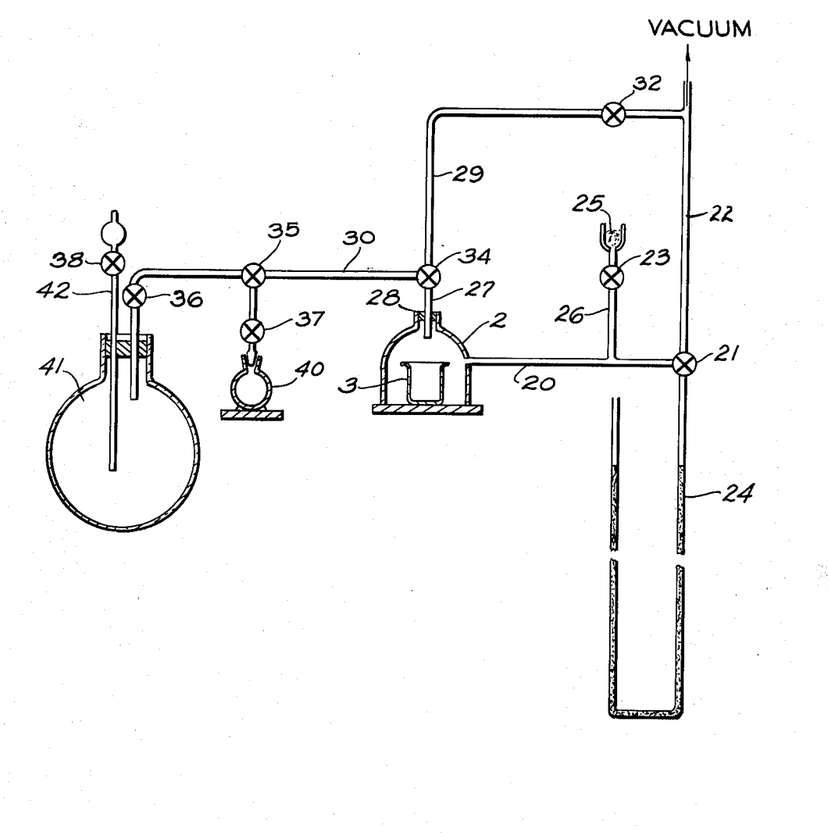

These and other objects, advantages, and features of the subject invention are accomplished by the treatment of contaminated materials with vapors or solutions of formic acid, or of substances or mixtures which yield formic acid upon heating, hydrolysis, or other reaction, in conjunction with treatment of the contaminated materials with epoxide in the manner hereinafter described in detail for exemplary rather than limitative purposes, reference being made to the accompanying drawing, which shows schematically appropriate sterilizing apparatus useful in the practice of this invention.

The remarkable advantages achieved by the conjoint utilization of epoxides and formic acid do not depend simply upon additive properties, for exposure to formic acid vapors or solutions alone has only a very slight sporicidal effect and exposure to ethylene oxide or solution alone has only a very slight sporicidal effect in the time allotted, but the use of the two exposures, in either order, completely sterilizes the objects exposed. The exposures to the formic acid or its precursors and the epoxide can be performed in a great number of ways, as convenience and the nature of the contaminated material or of the equipment available may dictate, but the result obtained, that is, of improved and complete sterilization in relatively short exposure times, is unexpected, novel, and of great potential benefit.

While no intention should be inferred to limit the observed and proved utility of this invention for sterilization purposes, the following hypothesis may be a useful aid in understanding the nature of the invention. It is known, in conventional epoxide sterilization techniques, that a certain critical time of epoxide treatment must be utilized in order to effect an adequate degree of sterilization. Apparently, cessation of epoxide treatment before this critical time has elapsed permits at least some of the enzyme-epoxide combinations to revert or dissociate, and the contaminated object being treated is not adequately sterilized. However, by treating the contaminated object with formic acid in conjunction with epoxide (regardless of any order of treatment), a much shorter critical time is observed. It may be that the actual chemical species responsible for the irreversible damage to the bacteria is a labile intermediate formed between the formic acid and the epoxide in combination with the bacterial material. However, experimentation indicates that the reaction product of formic acid and ethylene oxide is not per se sporicidal. For example, when the reaction product of equimolar amounts of the two materials is applied to bacterial spores, no sterilizing action is noted. However, when formic acid and ethylene oxide are allowed to react in the liquid phase, an intermediate is apparently formed, as indicated by the yellow coloration imparted to the warm reaction mixture, the said color disappearing upon completion of the reaction and cooling of the resultant product. It could be that this intermediate is the biologically active species, and the final reaction product of formic acid and ethylene oxide may be chemically unable to react with the sensitive bacterial system. An alternate explanation for the observed phenomena may reside in physical as opposed to chemical considerations, such as the inability of the final reaction product to diffuse or to reach the sensitive bacterial site even though it might otherwise be toxic, whereas the individual reactants, being much smaller in molecular dimensions, may be able to reach the site separately, and, once there, to react in the desired toxic manner.

Regardless of the underlying reasons, it has been conclusively found that epoxide sterilizing agents can be potentiated in their action against microorganisms by formic acid or by substances or mixtures which upon heating, hydrolysis, or other suitable reaction will yield formic acid. This invention is not limited to the application of the compounds in any specific phase, nor to both in the same phase, nor in any specific order, except for the requirement that the two compounds must not completely react with one another before at least one of them contacts the microorganisms. Thus, as an example, ethylene oxide and formic acid may be applied consecutively as vapors from separate reservoirs; a pool of formic acid, or a pad or envelope saturated with formic acid, may be placed in a container such that the acid vaporizes, followed by treatment of the interior of the container with ethylene oxide vapor; or, the exposure to formic acid may take place in one chamber, the contaminated objects may they be removed to another chamber, and then the objects may be exposed to ethylene oxide in the second chamber.

In yet another manner of performing the subject invention, a contaminated object may be placed in a solution of formic acid, subjected to evacuation or warming to remove excess pools of liquid, and then exposed to ethylene oxide. The ethylene oxide exposure may be in a vacuum chamber, or in other conventional sterilization chambers in which neither vacuum nor pressure is exerted during the gas exposure.

In a preferred embodiment of the invention, the formic acid and the epoxide such as ethylene oxide are utilized in the forms of solutions in inert solvents. This practice has been found to yield sterilization with extreme rapidity. Suitable solvents are methyl formate, methyl ethyl ketone, and halogenated hydrocarbons such as carbon tetrachloride.

Examples of the practice of this invention as hereinafter presented conclusively demonstrates that the improved sterilization effects are evidenced when the formic acid and the epoxide are both applied as gases, as liquids, or when one of the components is in the vapor phase and the other is in the liquid phase. It follows from these results that solid materials containing either ingredient in an adsorbed state would also serve as a source for the active compounds; similarly, chemicals or mixtures of chemicals capable of reacting to form the active materials are extensions of the same principles underlying the subject invention, and are intended to be covered thereby. As an example of this latter concept, a mixture of glycerin and oxalic acid could be adsorbed on paper. Heating of paper as so treated would generate formic acid vapors which could be utilized in conjunction with ethylene oxide sterilization of materials within or near the paper so impregnated.

In order to understand the details of the various examples which illustrate the practice of this invention, it will be instructive to appreciate the laboratory techniques utilized to sterilize a given contaminated standard and to measure the degree of sterilization achieved thereby. The drawing illustrates apparatus which was utilized to establish the conditions required for the observed potentiation of the activity of ethylene oxide vapors. In the drawing, a bell jar 2 (290 milliliters volume) served as an exposure chamber for contaminated discs or other objects being tested. The tested objects were placed within beaker 3, either wrapped in paper or unwrapped, inside the bell jar 2. A glass tubing line 20 was connected to a vacuum tubing line 22 by the valve 21. An open end mercury manometer 24 was also connected to the valve 21, such that the pressure within the bell jar 2 could be indicated thereby. Atmospheric air could be introduced into the bell jar 2 by virtue of the cotton filter 25 which was positioned on one side of a valve 23 which in turn was connected to the glass tubing 20 by a glass tubing 26. Another glass tubing line 27 was connected to the bell jar 2 via the sealed stopper 28. The tubing 27 was connected to a valve 34, to which tubing members 29 and 30 were also attached. The tubing member 29 was connected to the vacuum tubing 22 via a valve 32, and the tubing member 30 was connected to a valve 35. The valve 35 was also connected to the chambers 40 and 41 via the valves 37 and 36 respectively. The chamber 41 was provided with an auxiliary feedline 42, controlled by the valve 38, such that the supply of material therein could be replenished without interrupting a given test run.

With the equipment shown in the drawing, the bell jar 2 could be evacuated, and room air could be drawn therein through the cotton filter 25, or the vapors or chemicals generated or placed in chambers 40 and 41 could be admitted to the bell jar 2 in any desired order and at any desired pressure. Chambers 40 and 41 could also be evacuated and heated in order to obtain saturated atmospheres of the chemicals placed within them before admitting the vapors to the bell jar 2. Insofar as practical, all of the connecting tubing elements were made of glass, the rubber connections were sealed with shellac, and the essentially air tight apparatus thus achieved was capable of holding a vacuum for a considerable period of time without leakage.

The degree of sterilization achieved in the examples described herein was determined in the following manner:

A water suspension of the highly resistant spore of *Bacillus subtilis* var. *niger* was applied to discs of filter paper or other material, and the material so contaminated was allowed to dry by exposure on a warm surface for approximately one-half hour. The spore-laden discs were then stored at room temperature and ambient humidity until required for a test. On placing the disc in 100 cc. of sterile water containing 0.01% by volume of a non-ionic detergent (Tween 60) and shaking the bottle of water, the spores were distributed between the surface and the water. An aliquot of this water was placed in a Petri dish, and a suitable nutrient medium containing agar was added, in a molten condition, to the dish. Upon hardening, the dish was incubated at 37° C. for 48 hours, and the number of bacterial colonies which had developed with the nutrient medium was counted. Through the course of one year's work, using the same spore suspension to inoculate the discs, and a technique as standardized as possible, there were recovered from each disc between 2,500 and 30,000 spores, with an average of 9,500 spores per disc. Five discs were considered a single "sample" for each condition, so the number of organisms recovered from an untreated "sample" was between 12,500 and 150,000 spores. When discs had been treated, then sampled in this manner, and no viable spores were recovered from the water bottle, the sample was considered to have been sterilized. It is still possible, of course, that less than one viable spore remained per milliliter of water and thus that the aliquot placed upon the Petri dish showed no growth, though the discs still contained viable spores. This was checked in a number of cases by a more rigid method of ascertaining the sterility of an object. A treated disc, or other test object, was placed, using aseptic technique, in a tube of thioglycollate broth, and the broth incubated for seven days at 37° C. If the broth remained clear, with no microbial development after this period of time, it was concluded that the treatment had sterilized the object.

The above methods of contamination and sampling were employed to ascertain whether the process in question was capable of sterilizing. In other tests, vegetative cells, both in pure cultures and in natural mixtures, were employed as test organisms, as were cultures of fungi. The bacterial spores always proved the most difficult microorganisms to inactivate, and so the experimental work reported herein refers to spores. Both as a matter of definition and of safety, a process must be capable of inactivating spores in order to be called a sterilizing process.

A number of examples of tests performed to establish the principle of the invention are hereinafter reported; these examples should be considered as exemplary only, as obvious extensions of these applications will occur to practitioners skilled in the art of sterilization.

EXAMPLE 1

The apparatus illustrated in the drawing was used in a series of experiments performed in order to establish the conditions required for the observed potentiation of the activity of ethylene oxide vapor.

In the series of tests which comprise this example, discs of filter paper 1.0 cm. in diameter contaminated with the spore form of Bacillus subtilis var. niger were placed without other wrapping in the beaker 3 in bell jar 2 and the entire system was evacuated. Liquid formic acid was placed in chamber 40, and liquid ethylene oxide in chamber 41, and the two flasks were evacuated separately until the liquid phases showed active boiling, indicating the pressures in the flasks were equal to the vapor pressures of the compounds at the temperature of the flasks. After the preliminary evacuation, formic acid vapor was admitted to the bell jar 2 to the pressure desired. Room air was then admitted through the cotton pad 25 which filtered out air-borne bacteria, until the bell jar 2 reached atmospheric pressure. Under this condition, the formic acid vapor was allowed to remain in contact with the contaminated discs for a period of time measured from the beginning of the admission of the vapor (this period in most instances was one minute). The bell jar 2 was once more evacuated, and ethylene oxide vapor was admitted from chamber 41 to the pressure desired. Again, room air was admitted after the desired amount of ethylene oxide so the discs were exposed at atmospheric pressure to a known pressure of ethylene oxide. At the end of the desired exposure (once more measured from the beginning of gas admission), the bell jar 2 was evacuated, and fresh room air admitted; this air was removed by a second evacuation, and replaced by new air from the room. This flushing process served to terminate the exposure of the contaminated discs to the ethylene oxide vapor. After this, the contaminated discs were removed and plated as described above to ascertain the number of viable bacteria still remaining on them. Each sample, as indicated above, consisted of five contaminated discs.

The results of some representative tests on filter paper discs exposed as described above to formic acid vapor first, then to ethylene oxide vapor, at room temperatures between 24° C. and 26° C., are given in Table I.

Table I.—*Sterilizing and non-sterilizing conditions for freshly contaminated paper discs containing spores of B. subtilis* var. niger *exposed to the vapors of formic acid and then ethylene oxide at 25° C. for the times indicated*

STERILIZATION ATTAINED

| Formic acid (first) | | Ethylene oxide (second) | |
|---|---|---|---|
| Pressure (mm. Hg) | Time (min.) | Pressure (mm. Hg) | Time (min.) |
| 2.0 | 1 | 200 | 20 |
| 2.0 | 1 | 399 | 10 |
| 4.0 | 1 | 106 | 10 |
| 4.0 | 1 | 231 | 10 |
| 4.0 | 1 | 300 | 10 |
| 4.0 | ¼ | 300 | 10 |
| 10.0 | 1 | 292 | 10 |
| 14.0 | 1 | 177 | 10 |
| ---------- | ------- | 217 | 30 |

STERILIZATION NOT ATTAINED

| Formic acid (first) | | Ethylene oxide (second) | |
|---|---|---|---|
| Pressure (mm. Hg) | Time (min.) | Pressure (mm. Hg) | Time (min.) |
| 2.0 | 1 | 202 | 10 |
| 2.0 | 1 | 360 | 10 |
| 4.0 | 1 | 112 | 5 |
| 5.0 | 10 | 267 | 1 |
| 10.0 | 11 | ---------- | ------- |
| ---------- | ------- | 238 | 10 |
| ---------- | ------- | 222 | 20 |

These results indicated in the table have been corroborated in essentially the same form by sufficient replication to assure authenticity. From this data, it may be concluded that:

(a) Successive treatment with formic acid vapor and ethylene oxide vapor accomplishes sterilization of resistant spores which neither of the individual chemicals is capable of accomplishing in the same total elapsed time.

(b) Using 2 mm. of formic acid vapor at 25° C. as the first treatment, 20 minutes, but not 10 minutes, of exposure to ethylene oxide vapor at a pressure of 200 mm. is required to effect sterilization of paper discs contaminated with spores.

(c) When the first treatment is formic acid at a pressure of 2 mm., the ethylene oxide treatment must be performed at a pressure of more than 360 mm., preferably 400 mm., if sterilization is to be effected in 10 minutes of exposure.

(d) A more effective first treatment consists in the application for one minute at 25° C. of a pressure of 4 mm. of formic acid vapor. Under these circumstances, a pressure of 106 mm. of ethylene oxide, applied after the formic acid is removed, accomplishes sterilization in 10 but not in 5 minutes. A preferred safe treatment ensuring sterilization at 25° C. involves the exposure of the contaminated items to 4 mm. of formic acid vapor followed by at least 200 mm. of ethylene oxide.

(e) The exposure to formic acid need not be as long as one minute, although for ease of manipulation, this was the period usually allowed. Even 15 seconds of exposure to 4 mm. of formic acid, followed by evacuation and treatment with 300 mm. of ethylene oxide, produced sterile discs.

(f) It should be noted that the discs in these experiments were not contained in any wrapping material. For ease of handling of objects after they are sterilized, it is usually the custom to wrap them in paper or muslin, or other material through which the sterilizing agent can penetrate. It is evident, therefore, that the limiting factor in selecting a practical process for sterilization will depend more upon the nature of the wrapping material than upon the need for any long time of exposure to formic acid. Once the formic acid has penetrated the wrapper, a very short time of contact seems to be all that is required for the potentiation of the ethylene oxide vapor in the step which follows.

EXAMPLE 2

Employing essentially similar techniques to those described in Example 1, exposures of paper and metal discs were conducted in which the contamination was microorganisms other than the spore form of *B. subtilis* var. *niger*. Discs containing droplets of cultures of *Escherichia coli* and of *Micrococcus pyogenes* var. *aureus*, two typical non-sporulating bacteria, were rendered completely sterile by exposure to the sequence of 1 minute at 4 mm. of formic acid and 10 minutes at 300 mm. of ethylene oxide at 25° C. Discs containing the spores and the vegetative mycelium of *Penicillium notatum*, a common fungus, were also sterilized. In further tests, dental burs made of metal and dental points of paper, guttapercha, and silver were contaminated with typical buccal flora by being used as toothpicks. The objects accumulated considerable tartar and debris in this process of contamination and were not washed or otherwise cleansed before exposure. The exposure was the same as that described above, 1 minute at 4 mm. of formic acid followed by 10 minutes at 300 mm. of ethylene oxide. After the exposure, the points and burs were placed aseptically into individual test tubes containing liquid thioglycollate media and incubated for 7 days at 37° C. to establish whether they were sterile. While untreated contaminated objects showed heavy cloudiness in the test tubes within 24 hours, none of the exposed objects initiated any growth for the 7 days of incubation. Thus it was shown that not only spores are inactivated by this process, but vegetative cells as well, notwithstanding the amounts involved and the protection of these cells by a considerable amount of organic matter.

EXAMPLE 3

In the tests reported in Examples 1 and 2, the exposure to ethylene oxide began immediately after the removal of the formic acid vapor. A series of tests was also performed to determine if various periods of time could elapse between the formic acid exposure and the ethylene oxide application. In each test, spore-contaminated paper discs were first exposed to 4 mm. of formic acid vapor for one minute at 25° C. The discs were removed from the chamber and allowed to stand in the room for various periods of time; after this period of standing, the discs were exposed to 300 mm. of ethylene oxide for 10 minutes and plated to determine the number of survivors. Discs which had stood for 4, 19, and 33 minutes between the two treatments were rendered sterile; on the other hand, discs which had stood for 150 minutes or longer were not sterilized. Obviously, the length of time which may be permitted to elapse between the formic acid treatment and the ethylene oxide treatment will depend on a number of factors, such as the extent of formic acid treatment, the temperature of the contaminated object and of the room, the nature of the contaminated object, the nature and tightness of wrapping of the object, etc. It does seem, however, that some formic acid must remain on or near the microorganisms for the rapid sterilization by ethylene oxide to take place; it is also apparent that the formic acid effect is not a permanent one. Either the chemical evaporates completely from the site where it might be effective, or else it is converted within or on the bacterial cell to a product which does not exhibit any catalytic or synergistic activity when ethylene oxide is added.

EXAMPLE 4

Discs were prepared of a number of materials other than filter paper, contaminated with a bacterial spore suspension, dried, and exposed to the vapors of formic acid and ethylene oxide. The materials included rubber, polyethylene, glass, cellophane, and aluminum. In addition steel screws were contaminated, dried, and used as test objects. In all cases, exposure to 4 mm. of formic acid vapor for 1 minute followed by 300 mm. of ethylene oxide for 10 minutes, all at 25° C., rendered all surfaces sterile. Thus it may be concluded that the effect noted does not depend upon the nature of the contaminated surface. The same results, i.e., of applicability to various contaminated substrates, were noted in the tests reported in Example 2.

EXAMPLE 5

In order to determine the effect of raising the temperature of exposure to formic acid and ethylene oxide, the bell jar 2 was placed in an electrically heated chamber and all tubing, contaminated discs, etc., were raised to a temperature of 50° C. before beginning the exposures, instead of the usual ambient temperature of 24–26° C. A series of exposures to the vapor of formic acid alone, at a pressure of 4 mm. for 11 minutes at 50° C. indicated that sterility of the discs was never achieved by such conditions. However, after exposure for one minute at 50° C. to 4 mm. of formic acid vapor, followed by exposure to 132 mm. of ethylene oxide for 5 minutes or 209 mm. of ethylene oxide for 2 minutes, the discs were sterilized. As is true for all chemical reactions, and as has been found repeatedly for disinfection and sterilization rates, raising the temperature increases markedly the speed of the inactivation reaction. The present process conforms to the general kinetic principles, and these data indicate that it is quite practical to expect complete sterilization to take place within three minutes, providing penetration and temperature equilibration can be effected rapidly.

EXAMPLE 6

The test techniques described thus far have employed formic acid vapor first; after this was removed, ethylene oxide vapor was introduced. It has also been found, however, that the order of treatment could be reversed and sterilization still achieved. In the apparatus illustrated in the drawing, two tests were conducted with spore-contaminated discs at 25° C. which were first exposed to 349 mm. and 330 mm. respectively of ethylene oxide vapor. These were followed by one minute exposures to formic acid vapor, in the first case at 2 mm. pressure, in the second at 5 mm. pressure. Upon removal of the formic acid vapor and plating of the discs, it was found that sterility had been obtained in both samples. From these and similar tests, it may be concluded that essentially the same dosages of the two chemicals will sterilize contaminated discs, regardless of the order in which they are applied.

EXAMPLE 7

The following experiment was conducted in an effort to ascertain whether or not the final reaction product of formic acid and ethylene oxide is responsible for the novel sterilizing action exhibited by the practice of the subject invention.

To a flask containing 4.6 grams (0.1 mole) of formic acid was slowly added, with agitation, 4.4 grams (0.1 mole) of ethylene oxide which had been strongly chilled. As the ethylene oxide was added, a reaction occurred as evidenced by the generation of considerable heat in the flask, and the occurrence of a strong yellow coloration in the liquid mixture. The liquid was cooled, and addition continued. After standing 2 hours at room temperature the reaction mixture had lost its yellow coloration and smelled neither of formic acid nor of ethylene oxide. This mixture was used in a test against contaminated discs in the manner described in Example 2. Since the material was far less volatile than either of its components, the flask containing it (chamber 40 in the drawing) was warmed to provide a high concentration of the vapor in the bell jar. A pressure of 20 mm. of the vapor of this reaction mixture was reached in the bell jar, and discs were exposed at this pressure at 25° C. for 11 minutes. Not only were the discs not sterilized, but very little reduction in recovered viable spores was noted. From this experiment, it is concluded that the final reaction product of formic acid and ethylene oxide is not the chemical species causing the inactivation of microorganisms.

EXAMPLE 8

In the examples presented heretofore the gases were always admitted by drawing a vacuum in the enclosed chamber containing the samples to be sterilized and then connecting the chamber with the reservoirs containing the gases. However, it is not necessary that the gases be applied to the contaminated materials in this manner; ethylene oxide, for example, may be put in contact with the contaminated objects in any enclosure capable of retaining the gas for the brief period of time necessary, and the exposure may be at pressures lower than, equal to, or higher than atmospheric pressure.

To illustrate this, a series of experiments was performed in which the formic acid was vaporized in a vacuum, but the ethylene oxide applied at atmospheric pressure. The discs, contaminated as described with bacterial spores, were placed in a beaker within a small bell jar. Another beaker containing a small quantity of warm formic acid was also placed in the bell jar, and a vacuum drawn in the bell jar by means of a water aspirator. Visible condensation on the glass walls of the bell jar indicated that a saturated atmosphere of formic acid at the temperature of the jar (25° C.) had been obtained, after which room air was admitted to the bell jar until the contents reached the room pressure once more. The total contact time of formic acid vapors and the contaminated discs, starting from the instant the vacuum was applied until the discs were removed, was approximately one minute. The discs were removed and placed in small kraft paper envelopes in groups of five, each group constituting a sample.

One sample was retained on the laboratory bench to serve as control, while another was placed in a small, portable, commercial sterilizer known as the Ben Venue sterilizer (Ben Venue Laboratories, Inc., Bedford, Ohio). This apparatus sterilizes by the application of ethylene oxide vapor within a small enclosed cylinder, the vapor being generated by the evaporation of a solution of ethylene oxide in a halogenated hydrocarbon. The Ben Venue sterilizer is equipped with check valves which release the contained gases to the atmosphere when the pressure exceeds atmospheric. The initial concentration of ethylene oxide within the chamber has been analyzed as approximately 1000 milligrams per liter of air, which is equivalent to a vapor pressure of ethylene oxide of 730 mm. at 25° C. The ethylene oxide concentration falls rapidly because the gas leaks out of the chamber and air leaks in. At no time during the sterilizing cycle is there any pressure or vacuum in the sterilizer chamber.

Along with the wrapped samples of contaminated discs exposed to the formic acid, a kraft paper envelope with contaminated discs not exposed to formic acid was also treated with ethylene oxide in the Ben Venue sterilizer, for a ten-minute period, at 25° C. The results achieved are reported in Table II.

*Table II.—Viable spores recovered from contaminated paper discs treated in the Ben Venue sterilizer for 10 minutes, with and without formic acid pretreatment*

| Formic Acid Pretreatment | Ethylene Oxide Treatment | Viable spores recovered per sample |
|---|---|---|
| Formic acid, 1 min | Ben Venue Sterilizer, 10 min | 0 |
| Do | None | 3,500 |
| None | Ben Venue Sterilizer, 10 min | 8,000 |
| Do | None | 27,000 |

This test was repeated several times with essentially the same results. Both the ethylene oxide and the formic acid treatments effect some reduction in the number of viable spores, but only the successive treatment with the two chemicals sterilizes surfaces in this short period of time. The same results were also obtained using discs cut of aluminum instead of paper.

EXAMPLE 9

It has previously been stated that very dry materials are resistant to the action of ethylene oxide, and rehumidification of dried contaminated objects can make them susceptible to sterilization by this gas. The discs used in the tests above had been dried on a warm bath before use, but in all cases had been equilibrated to room humidity (40–50%) for several days before being used in a test. The resistance of such organisms differs from that of organisms on surfaces which have been stored in a very low humidity (10% or less) for an extended period of time, tests on which are hereinafter described.

However, the tests described in Example 8 were performed with a commercial formic acid solution containing 85% formic acid and 15% water, and there was some possibility that this amount of water was making the spores susceptible to the ethylene oxide in the Ben Venue sterilizer exposure. This possibility was checked in two ways. First, formic acid exposure was conducted using a commercial preparation containing 98% formic acid; the results were exactly similar to those employing the more dilute preparation of formic acid in water. Second, tests were conducted against discs which had been treated with water vapor prior to exposure to ethylene oxide in the Ben Venue sterilizer. In place of the warm formic acid in the bell jar described in Example 8, a beaker of water was used, and the discs were exposed to a saturated water vapor atmosphere. Subsequent exposure in the Ben Venue sterilizer indicated no greater or smaller reduction in viable spore count from humidified discs than unhumidified discs. Thus the formic acid effect differs materially from the effect of water in rendering spores more susceptible to the action of ethylene oxide.

EXAMPLE 10

A quantity of technical grade isopropyl formate was warmed, and its vapors allowed to contact spore-contaminated paper discs for one minute, as described in Example 8. The discs were then removed, placed in paper envelopes, and exposed to ethylene oxide vapor in the Ben Venue sterilizer at 25° C. for 10 minutes. The sample was found to have been sterilized by this procedure. However, a sample of freshly distilled isopropyl formate (B.P. 67.5–69.5 corr.), which was kept dry, showed no activity at all as a potentiator of ethylene oxide activity, and samples removed from the Ben Venue sterilizer after 10 minutes of exposure to the distilled isopropyl formate still retained large numbers of viable organisms. Fractionation of the technical grade isopropyl formate indicated it contained a significant amount (3%) of formic acid. Formic acid esters are known to be readily hydrolyzable, and the activity noted in the technical material was apparently due to its formic acid content. It would seem, therefore, that if conditions can be arranged to speed up the hydrolysis of formic acid esters, they will act as sources of formic acid, and thus as potentiators of the ethylene oxide activity. On the other hand, pure formic acid esters, not permitted to hydrolyze, do not show this effect.

In another series of tests, paper discs were wetted with aqueous solutions of sodium formate and exposed to ethylene oxide, and no potentiation was noted. Nor was any potentiation noted when the discs were dried after saturation with sodium formate solution and then exposed to ethylene oxide. However, after treatment with concentrated sulfuric acid, formic acid was generated from the sodium formate, and the potentiating effect was noted.

EXAMPLE 11

One of the chief drawbacks to the conventional utilization of ethylene oxide vapor for sterilization is the extreme resistance of very dry bacterial spores and even of vegetative cells. In order to determine whether formic acid is able to make ethylene oxide effective against dry microorganisms, the following tests were performed:

A large number of paper discs were contaminated with the spore form of *Baccillus subtilis* var. *niger* and stored in a desiccator over solid calcium chloride for 5 months. At the end of this time, 40 discs were removed and divided into 8 samples of 5 discs each. Four of the samples were placed in kraft paper envelopes, two were put in glassine paper envelopes, and two samples were put in small uncovered glass beakers. Two of the kraft envelopes, two of the glassine, and the two unwrapped samples were exposed for one minute to vapors of formic acid, as described in Example 8. One of each type of sample was placed in the Ben Venue sterilizer, together with a kraft-wrapped sample which had not been exposed to formic acid vapor; the other four samples remained on the laboratory bench during the 10 minute exposure period which took place in the Ben Venue sterilizer. At the end of this 10 minute period, all 8 samples were plated by the usual technique to determine the number of survivors. The results obtained are given in Table III.

*Table III.—Viable spores recovered from discs after extreme desiccation and various treatments*

| Wrapping | Untreated | Formic acid only, 1 min. | Ethylene oxide in B.V.S. only, 10 min. | Formic acid, 1 min., followed by B.V.S., 10 min. |
|---|---|---|---|---|
| None | | 13,000 | | 0 |
| Kraft paper | 25,000 | 25,000 | 17,500 | 3,100 |
| Glassine paper | | 25,000 | | 25,000 |

It is immediately apparent that the presence and choice of wrapping material affects the success of the sterilization procedure. This effect will be more fully discussed in the Example 12. However, two important conclusions are evident from this example:

(1) The treatment with ethylene oxide in the Ben Venue sterilizer for 10 minutes only reduced the viable count from 25,000 to 17,500, while with discs which are not so highly desiccated, far greater reduction is obtained (as shown in Example 8, to 8,000).

(2) Formic acid pretreatment renders desiccated organisms susceptible to ethylene oxide sterilization, which is a material achievement of this invention.

A second series of tests was employed to demonstrate that very dry discs were indeed more difficult to sterilize than those equilibrated at room humidity and that the formic acid pretreatment did indeed render such very dry discs sterile. In the apparatus illustrated in the drawing, discs which had been dried over calcium chloride for 8 months were exposed to the vapor of anhydrous formic acid (4 mm.) at 25° C. for one minute. They were then exposed to ethylene oxide vapor (119 mm.) for 10 minutes. This ethylene oxide exposure, found sufficient to sterilize the ordinary undesiccated discs, did not produce sterile discs; another exposure, to 107 mm. of ethylene oxide for 10 minutes, was required before sterility was attained. However, without formic acid vapor, the discs required 30 minutes of exposure to 150 mm. of ethylene oxide vapor to become sterile. Thus, although desiccated spores are more resistant than undried spores to the action of ethylene oxide vapor, a pretreatment with formic acid markedly decreases their resistance.

In the same apparatus a test was conducted at 50° C., as described in Example 5. Exposure for one minute to formic acid vapor (4 mm.) followed by 2 minutes of exposure to ethylene oxide at 310 mm. at 50° C. sterilized these highly desiccated spores. At this temperature, exposure to 299 mm. of ethylene oxide alone did not sterilize, nor did 4 mm. of formic acid vapor alone for 3 minutes. This last series of tests illustrates the practicality of a process capable of sterilizing within three minutes objects containing a type of contamination which cannot be sterilized by any concentration or time of exposure of ethylene oxide by conventional techniques.

EXAMPLE 12

Experience with the use of ethylene oxide in conventional sterilization has indicated that kraft paper does not present a serious penetration barrier to this gas, and that objects wrapped in glassine, while sterilized more slowly, still can be sterilized by exposure to ethylene oxide. Thus the data in Example 11, which indicate a barrier to complete sterilization imposed by both types of wrapping material, required further investigation. It appeared most likely that the wrappings were barriers to the passage of formic acid vapor rather than ethylene oxide. In any event, since it is convenient to wrap objects to be sterilized before placing them in a sterilizer, so that contamination after sterilization can be minimized, the subject was examined further in the following manner:

The same batch of dry discs employed in the test of Example 11 was used. Twenty-five discs were exposed, unwrapped, in a beaker, to the vapors of warm formic acid generated in an evacuated bell jar for one minute. After the one minute exposure, the discs were removed; 5 were placed on the laboratory bench; 5 in a kraft paper envelope, 5 in a glassine envelope; 5 in a sulfite paper envelope; and 5 were left in the beaker. The latter 4 containers were then transferred to a Ben Venue sterilizer and were there exposed to vapors of ethylene oxide for ten minutes at room temperature. At the end of this exposure, all 5 samples were plated. The sample exposed only to the formic acid vapor had 6,500 viable spores; all other samples were completely sterile. It is thus apparent that the penetration of the wrapping by the formic acid vapor, rather than by the ethylene oxide vapor, is the limiting factor in determining whether sterilization will take place. That formic acid is not a penetrating material, despite its low molecular weight, is not surprising, for formaldehyde vapor and propiolactone vapor are also not penetrating materials, and special precautions must be taken to be certain that they reach all contaminated locations of a sample. Despite the delay imposed by the barrier on the contact of formic acid with the contaminated location, samples contained in kraft and glassine paper wrappings have been sterilized by the formic acid-ethylene oxide method, particularly at high temperatures like 50° C., where diffusion takes place much more rapidly.

EXAMPLE 13

Ethylene oxide is not the only member of the epoxide family of compounds to show sterilizing activity; the next higher homolog, propylene oxide, also exhibits this property, although to a lesser degree. There are, however, situations where the lower volatility of propylene oxide makes it the sterilizing agent of choice over ethylene oxide, despite the lower activity both on a weight and on a molar basis. Also, it has been found that sterilization with ethylene oxide leaves residues upon some materials which may be harmful, and such treatment is not approved for some materials by the Food and Drug Administration. Under the same circumstances, treatment with propylene oxide does not leave harmful residues.

A series of tests was conducted in the apparatus shown in the drawing, as described in Example 1, to determine whether formic acid potentiated the sterilizing activity of propylene oxide as it did that of ethylene oxide. Dry spores on paper discs were exposed at 25° C. to propylene oxide at a pressure of 257 mm. for ten minutes; the discs were not sterilized. Another exposure, at an average pressure of propylene oxide of 274 mm. for 20 minutes also did not sterilize the discs. It required 30 minutes of exposure to 283 mm. of propylene oxide vapor at 25° C. to effect sterilization.

Similar discs were exposed to 4 mm. of formic acid vapor for one minute, and then to 119 mm. of propylene oxide vapor for 10 minutes: they were not sterile. However, 107 mm. of propylene oxide for 20 minutes following a one-minute formic acid exposure at 4 mm. did produce sterile discs. This is about one-fourth the dosage of propylene oxide found necessary to produce sterile discs in the absence of formic acid.

It seems clear that propylene oxide as well as ethylene oxide is rendered more effective as a sterilization agent when formic acid vapor is used as a pretreatment. The same effect is also exhibited on other epoxides which evidence sterilizing activity such as glycidyl and epichlorohydrin type compounds.

EXAMPLE 14

In the examples cited thus far, ethylene oxide has been applied both in the form of a pure vapor, and as a solution in halogenated hydrocarbons which vaporize into a chamber. However, the formic acid has been applied only as a pure vapor (or with a small amount of water as a diluent). However, it may prove desirable to apply the formic acid as a solution. The following test was performed:

The apparatus shown in the drawing and the technique of Example 1 were employed, except that instead of the pure formic acid placed in the evaporating chamber 40, a solution of formic acid in methyl formate was used. A solution of formic acid was prepared containing 13.3% by weight of formic acid (mole fraction of formic 0.17). This solution was evaporated into the evacuated bell jar containing contaminated discs, until the pressure in the bell reached 322 mm. of vapor; the sample was allowed to contact this atmosphere for one minute at 25° C. The vapor was removed by evacuation, and replaced by an atmosphere containing 314 mm. of ethylene oxide vapor at 25° C., which contacted the sample for 10 minutes. At the end of this time, the vapors were removed and the sample plated. Complete sterility was attained.

On the assumption that the formic acid behaved as an ideal solution, a calculation was made of the pressure of pure formic acid in the bell jar during the exposure. The mole fraction of formic acid in the liquid phase was multiplied by the vapor pressure of pure formic acid at 25° C., and the same was done for the methyl formate component. The total vapor pressure of the particular concentration of formic acid used was calculated, in this way, to be 481.5 mm., of which 6.5 mm. was due to formic acid. Since the total observed pressure was only 322 mm., it is calculated that the formic acid pressure in the bell jar was in the same ratio to this as it would be to the saturated vapor pressure of the mixture, so the calculated formic acid pressure was 4.3 mm. of mercury. This is very close to the 4 mm. found necessary to make 300 mm. of ethtylene oxide effective as a sterilizing agent within 10 minutes.

Obviously, any solvent may be used to dissolve and store the formic acid as long as the solution is a stable one, and the solvent does not interfere with the sterilizing action. The formic acid concentration in the solvent must be chosen so as to provide an effective concentration of formic acid vapor at a convenient total pressure to perform the activation.

EXAMPLE 15

In the previous examples, the formic acid and ethylene oxide have been applied to the contaminated materials in the form of vapors derived by evaporating either the pure chemicals or solutions of them in separate reservoirs. It is possible, however, to apply formic acid vapor by evaporating it from a material with which the acid has been associated, as by impregnating or by coating, and this could well be the preferred method in commercial practice. It has been shown above that both kraft and glassine papers serve as barriers for the passage of formic acid vapor; if, however, the paper could be used as a reservoir for the vapor, then evaporation from the paper would take place into the package, and the barrier effect would be eliminated as a factor.

Both kraft and glassine paper envelopes were soaked for 45 minutes at room temperature in a solution prepared by adding one gram of formic acid to 9 grams of methanol. At the end of this time, the envelopes were placed upon a steam bath and heated till they were dry to the touch. Contaminated discs were placed inside the envelopes, which were then placed in the bell jar 2, which had been warmed to 50° C. A vacuum was drawn in the bell jar and held for one minute; then 306 mm. of ethylene oxide were introduced into the bell jar, and held for 2 minutes. The envelopes were then removed and the discs plated. Complete sterility was obtained.

This method eliminates one reagent and one of the steps of the steriling process, replacing these items with a readily prepared and stable item, namely, a treated envelope. Similar results were obtained when paper or aluminum contaminated discs were soaked in 10% solutions of formic acid made in methanol or methyl formate, dried on a steam bath, and exposed to ethylene oxide. Here again it is apparent that residual formic acid is evaporated from a reservoir which is a solid material, rather than a separate container or structure in the apparatus. As controls in these tests, envelopes and discs were soaked in both methanol and methyl formate, and no sterilization took place when the ethylene oxide exposure was made.

An alternate approach to the same results resides in the coating of a surface of a substrate, such as paper, with formic acid (as by a conventional polyvinyl alcohol coating composition). This approach is especially meritorious when the substrate is permeable to epoxide passage but impermeable to formic acid passage.

EXAMPLE 16

Contaminated paper discs were immersed for one minute in a 5% (by volume) aqueous solution of formic acid, and were not dried prior to exposure in the apparatus shown in the drawing. Exposure was at 25° C. to 276 mm. of ethylene oxide for 10 minutes; sterilization did not occur. Since the use of a preliminary dip in formic acid solution, followed by treatment with ethylene oxide vapor, was considered a possibly useful procedure, further experiments were conducted to determine under what conditions such a system might work.

Spore contaminated discs were dried and stored at ambient temperature and humidity. A solution of formic acid 11.1% by weight in methyl formate was prepared. Ten discs were immersed in this solution for one minute, then removed; 5 were placed on kraft paper on the laboratory bench; and 5 were placed in a small kraft paper envelope. Ten other discs were immersed for the same one minute in methyl formate, and 5 were placed on the laboratory bench while 5 were put in a kraft paper envelope. The two envelopes, as well as a third containing untreated discs, were placed in a Ben Venue sterilizer and exposed to ethylene oxide vapor at room temperature for 10 minutes. The number of viable spores was determined for each sample; results were as indicated in Table IV:

*Table IV.—Spores surviving immersion in formic acid solution (11%) exposure to ethylene oxide*

| Pretreatment with formic acid | Not exposed to ethylene oxide in B.V.S. | Exposed 10 mins. to ethylene oxide in B.V.S. |
| --- | --- | --- |
| None | 161,000 | 54,000 |
| Immersion in methyl formate | 147,000 | 245,000 |
| Immersion in formic acid solution in methyl formate (11%) | 59,500 | 8,000 |

Discs were far from sterile after this treatment, though a great reduction in numbers after the formic acid-ethylene oxide treatment is apparent. The test was therefore repeated, using a more concentrated solution of formic acid in methyl formate (23.8% formic acid). In the repetition, the methyl formate exposures were omitted since these had been shown to be without effect on the outcome of ethylene oxide sterilization. Instead, some of the discs were exposed in an open beaker in the Ben Venue sterilizer as well as those which were wrapped in kraft paper. The results of this second test, with each sample consisting of 5 contaminated discs, were as indicated in Table V.

*Table V.—Spores surviving exposure to formic acid solution (24%), ethylene oxide vapor*

| Pretreatment, wrapping | Not exposed to ethylene oxide | Exposed 10 min. to ethylene oxide (BVS) |
| --- | --- | --- |
| None; kraft paper | 168,000 | 24,000 |
| Formic acid sol; none | 160,000 | 0 |
| Formic acid sol; draft paper | | 0 |
| Formic acid sol 11 min | 43,600 | |

The results obtained were unequivocal: immersion for less than one minute in a 24% by weight (20% by volume) solution of formic acid in methyl formate renders paper discs, contaminated with bacterial spores, sterile when they are treated for 10 minutes at room temperature with ethylene oxide vapor in a Ben Venue sterilizer. Omission of the ethylene oxide or the formic acid steps reduces the viable count, but does not produce sterility.

EXAMPLE 17

The observations reported in Example 16, namely, that immersion in a formic acid solution followed by exposure to ethylene vapor materially accelerated sterilization, were extended to metal objects simulating medical and dental instruments. Strands containing five paper clips each were prepared and contaminated by the application of saliva and by immersion in a suspension of bacterial spores. The strands were then dried. The many crevices which these strands offered, capable of preventing access of a sterilizing agent, bore a likeness to many of the objects which require sterilization in medical and dental practices.

Three strands were dipped into a 23.8% (by weight) solution of formic acid in methyl formate, and allowed to remain in contact with this solution for about one-half minute. One strand was removed and allowed to stand on the table; a second strand was removed and placed, in a kraft envelope, in a Ben Venue sterilizer. The third strand was placed in a kraft paper envelope and exposed in a bell jar to a vacuum (pressure about one-half cm.) for one-half minute, in order to evaporate excess liquid. Still in its envelope, this strand was placed in the Ben Venue sterilizer together with the one which had not been evacuated, and the ethylene oxide vapor admitted to the sterilzer for a period of ten minutes at room temperature. Upon completion of the exposure, the two treated strands as well as the control were placed in 100 ml. of sterile water containing 0.01% nonionic detergent, shaken thoroughly, and aliquots of the water plated. Surviving spores on each strand were as indicated in Table VI.

*Table VI.—Viable spores recovered from simulated instruments*

Formic acid solution, no evacuation, no ethylene oxide ______________________________ 36,000
Formic acid solution, no evacuation, ethylene oxide (BVS) ______________________________ 3,400
Formic acid solution, evacuation, ethylene oxide (BVS) ______________________________ 0

It is believed that the evacuation process serves to evaporate pools of solution which otherwise cling to and prevent the contact of ethylene oxide vapor with contaminated surfaces of the object being treated.

No corrosive effect was noted on the steel paper clips which formed the simulated instruments in this test. Obviously, the described results would apply to a dental instrument, similarly contaminated by saliva.

EXAMPLE 18

The foregoing examples establish that sterilization can be accomplished by exposure either to the vapors of formic acid and of ethylene oxide, or to solutions of formic acid followed by ethylene oxide vapors. This example is concerned with exposure of contaminated materials to a sequence of solutions of these two chemicals.

Two solutions were prepared using methyl formate as an inert solvent, namely, formic acid 16% by weight (mole fraction 0.20) and ethylene oxide 15.5% by weight (mole fraction 0.20). Paper discs containing dry spores of *Bacillus subtilis* var. *niger* were dropped into a beaker containing the formic acid solution; some were removed after one minute and placed in a beaker containing the ethylene oxide solution, where they remained for 9 minutes. Other discs were first immersed in the ethylene oxide solution for 9 minutes, then transferred for one minute to the formic acid solution. Two sets were used as controls, one remaining in the formic acid, the other in the ethylene oxide solutions for the entire ten minute period. In this set of tests, a considerable reduction in count was observed in those discs which were transferred between the two solutions, while very little reduction occurred in those discs which remained in the original solution. However, completely sterile discs were not obtained with uniform success.

New solutions were prepared in methyl formate; the formic acid was at the same concentration as previously (16% by weight, mole fraction 0.20), but the ethylene oxide solution was twice as concentrated as before (33% by weight, or 0.40 mole fraction). In this experiment, all the discs were placed in the formic acid solution for one-half minute and were then transferred to the ethylene oxide for various periods of time, after which they were diluted in sterile water and the number of surviving spores determined. Discs were also allowed to stand in the formic acid and the ethylene oxide solutions without transfer for 10 minutes. The results obtained were as indicated in Table VII.

Table VII.—*Viable spores recovered from paper immersed in solutions of formic acid (16%) and ethylene oxide (33%) in methyl formate for various times at 25° C.*

| Time in formic acid solution (min.) | Time in ethylene oxide solution (min.) | Viable spores recovered |
|---|---|---|
| 10 | 0 | 15,100 |
| 0.5 | 2 | 8,700 |
| 0.5 | 4 | 8,700 |
| 0.5 | 6 | 300 |
| 0.5 | 8 | 0 |
| 0.5 | 10 | 0 |
| 0 | 10 | 1,100 |

The basic phenomenon observed in the previously described experiments with vapors, and with solutions and vapors, is once more apparent; neither formic acid alone nor ethylene oxide alone causes the complete sterilization of objects containing these resistant spores in the same short time which is possible when the two chemicals are applied in sequence.

In another series of experiments with the two chemicals in similar concentrations in solution to those used above, it was established that either a sequence of 9 minuutes in ethylene oxide followed by one minute in formic acid, or a reversed sequence, sterilized spore-contaminated discs. Also, raising the temperatures of the two solutions increases the rate of sterilization.

EXAMPLE 19

Experiments were conducted to determine what the effect would be of using different solvents for the formic acid, on the acceleration of the rate of sterilization by ethylene oxide solutions. Twenty percent (by weight) solutions of formic acid were prepared in water, methanol, methyl ethyl ketone, and a mixture containing 71% by weight of carbon tetrachloride and 29% of methyl formate. The last solvent system was chosen because pure carbon tetrachloride would not dissolve formic acid to the extent of 20%.

Two paper discs contaminated with spores were placed in each of these formic acid solutions. After one-half minute of contact at room temperature, one of these discs was removed and placed in a 33% solution (by weight) of ethylene oxide in methyl formate, where it remained for 9.5 minutes. At the end of this exposure, the disc was removed from the ethylene oxide and also from the formic acid and was diluted in sterile water. The water was plated in the usual manner. Results were as indicated in Table VIII.

Table VIII.—*Viable spores recovered from paper immersed in 20% formic acid solutions in various solvents, then exposed to 33% ethylene oxide solution in methyl formate*

| Solvent for formic acid | Spores recovered after 10 min. in formic acid | Spores recovered after ½ min. in formic acid, 9½ min. in ethylene oxide |
|---|---|---|
| Water | 8,100 | 5,600 |
| Methanol | 2,700 | 200 |
| Methyl ethyl ketone | 9,500 | 0 |
| Carbon tetrachloride plus methyl formate | 13,100 | 0 |

The data indicate that water interferes with the sterilization process, methanol slightly so, while the nonpolar solvents had no effect. A wide variety of solvents is thus available for application in this aspect of the invention.

The foregoing exemplary embodiments illustrate the wide latitude of the subject sterilizing techniques. Some immediate and practical utilizations of the invention are suggested by the techniques described herein. For example, the sterilization of filter paper which is conclusively demonstrated by the foregoing examples is directly utilizable in various industrial and laboratory techniques wherein sterile filter paper is a prerequisite (e.g., precipitation and filtration of an organic compound under sterile conditions such as in biochemical laboratory techniques). Also, the sterilization of other materials, such as glass, plastic, metal, etc., as shown by the examples, immediately suggests the applicability of the instant invention to the treatment of conventional air purifiers and filtering units in order to sterilize the integral parts thereof.

It should be understood that various changes and modifications may be effected in the details of operation, formulation, and manner of practicing the subject invention, without departing from the spirit and the scope thereof, as defined in the appended claims. In the said claims, the term "formic acid" should be interpreted to mean formic acid per se as well as substances or mixtures which yield formic acid as upon heating, hydrolysis, or otherwise, and the term "epoxide" should be taken to mean compounds of the type (or progenitors thereof) which exhibit biocidal properties, such as the ethylene oxide and the propylene oxide described in detail herein.

What is claimed is:

1. A method of sterilizing a given object which comprises the step of subjecting the object to treatment with formic acid and an epoxide.

2. The method as claimed in claim 1 in which the object is treated with vaporized formic acid.

3. The method as claimed in claim 1 in which the object is treated with vaporized epoxide.

4. The method as claimed in claim 1 which the object is treated with vaporized formic acid and with vaporized epoxide.

5. The method as claimed in claim 1 in which the object is treated with liquid formic acid.

6. The method as claimed in claim 1 in which the object is treated with liquid epoxide.

7. The method as claimed in claim 1 in which the object is treated with liquid formic acid and with liquid epoxide.

8. The method as claimed in claim 1 in which the object is treated first with formic acid and then with epoxide.

9. The method as claimed in claim 1 in which the object is treated first with epoxide and then with formic acid.

10. The method as claimed in claim 1 in which the epoxide comprises ethylene oxide.

11. The method as claimed in claim 1 in which the epoxide comprises propylene oxide.

12. The method of sterilizing a given object which comprises the step of subjecting the object to treatment with formic acid and an epoxide at elevated temperatures so as to enhance the attainment of sterilization.

13. The method of sterilizing a substantially moisture free object which comprises the step of subjecting the object to treatment with formic acid and an epoxide under substantially moisture free conditions.

14. The method of sterilizing a given object contained within a wrapping material which comprises the steps of subjecting the surface of the object to treatment with formic acid and passing an epoxide through the wrapping material to the surface of the object.

15. The method of sterilizing a given object which is contained within a wrapping material which comprises the steps of applying formic acid to the wrapping material and thereafter subjecting the wrapping material to epoxide vapor treatment.

16. The method as claimed in claim 15 in which the wrapping material comprises a substrate having formic acid applied to a surface thereof.

17. The method as claimed in claim 15 in which the wrapping material comprises a substrate which is impregnated with formic acid and which is permeable to the passage of epoxide material therethrough.

References Cited by the Examiner

UNITED STATES PATENTS

| 2,075,845 | 4/1937 | Gross et al. | 21—58 X |
| 2,185,954 | 9/1937 | Ryner | 99—171.5 |
| 2,891,838 | 6/1959 | Kaye | 21—58 |

MORRIS O. WOLK, *Primary Examiner.*

F. W. BROWN, *Assistant Examiner.*